United States Patent Office 3,528,984
Patented Sept. 15, 1970

3,528,984
1,2-DIARYL BUTANE DERIVATIVES
John F. Cavalla, Isleworth, Roy Simpson, Maidenhead, and Alan C. White, Windsor, England, assignors, by mesne assignments, to John Wyeth & Brother Limited, Maidenhead, England, a British company
No Drawing. Filed May 19, 1967, Ser. No. 639,661
Int. Cl. C07d 29/32
U.S. Cl. 260—293          4 Claims

ABSTRACT OF THE DISCLOSURE

Certain 1,2-diarylbutanes bearing a heterocyclic radical containing a tertiary nitrogen atom at position 4 and substituted at position 2 by cyano, carboxamido, carboxy, alkanoyl, or hydroxyalkyl, exhibit interesting anti-inflammatory and CNS activity. These compounds are accordingly useful as analgesics, anti-convulsants, and anti-inflammatories. Suitable aryls are phenyl, methoxyphenyl, and hydroxyphenyl; suitable radicals containing tertiary nitrogen atoms include 4-pyridyl and 4-(1'-methyl)-piperidyl. Also suitable are the methiodides of these bases.

The present invention provides compounds of the general formula:

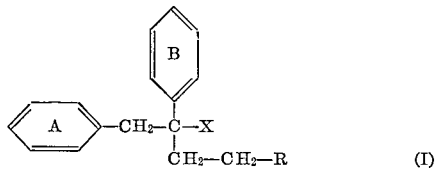

in which rings A and B are substituted or unsubstituted, X is a cyano radical, an unsubstituted, monosubstituted or disubstituted amide radical, a carboxylic acid or salt thereof, a carboxylic acid ester radical, an amino methyl radical, a primary or secondary hydroxyalkylene radical (or ether or ester thereof) or an alkanoyl radical and R represents a substituted or unsubstituted nitrogen-containing heterocyclic or aromatic ring linked by a ring carbon atom to the radical —CH$_2$—CH$_2$— of general Formula I. Examples of such further radicals R are pyridyl and piperidinyl radicals which may, if desired, be substituted on the nitrogen atom by a methyl radical. In this group of compounds, the ring is generally attached to the ethylene group in the 4-position to the nitrogen atom.

The compounds of the above general formula always contain a nitrogen atom and so they can form both acid addition and quaternary ammonium salts, and the invention also provides these salts as novel compounds. The acid addition salts may be prepared by reacting the free base with an acid, and the quaternary ammonium salts may be prepared by reacting the free base with an alkyl halide.

The compounds of the above general formula show interesting pharmacological activity and/or are intermediates in the preparation of similar compounds, which show pharmacological activity. In general, the compounds of the above general formula showed action on the central nervous system when tested on laboratory animals (e.g. rats and mice). For example, the compounds displayed one or more of the following, namely anti-convulsant activity, prolongation of barbiturate sleeping time and analgesic activity, and sometimes anti-inflammatory activity. They are also useful for testing pharmacological activity in laboratory animals.

The rings A and B are unsubstituted or are substituted by suitable substituents, for example, hydroxy, alkoxy (preferably methoxy or ethoxy), aralkyloxy (e.g. benzyloxy) alkyl (e.g. methyl or ethyl), sulphonic acid, or acyloxy (e.g. acetoxy) or halogen (e.g. chlorine).

When X does not contain an active hydrogen atom (e.g. X is a cyano or ester radical) the compounds of the above general Formula I may be prepared by reacting a 2-benzyl-2-phenyl-acetic acid derivative of the general formula:

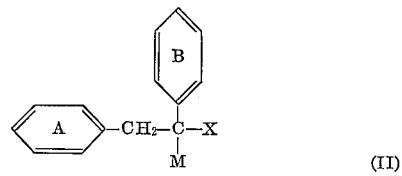

(in which X, A and B have the meanings defined above and M is an alkali metal, preferably sodium or potassium) with a compound of the general formula:

$$\text{Hal—CH}_2\text{—CH}_2\text{—R} \qquad \text{(III)}$$

in which Hal is a halogen atom and R has the meaning defined above. The reaction conveniently is carried out in suitable solvent, for example liquid ammonia, benzene, diethoxy ethane or dimethyl formamide (D.M.F.) at temperatures of from e.g. —20 to +80° C. The acetic acid derivative of general Formula II may be prepared by reacting the corresponding acetic acid derivative, in which M is a hydrogen atom with a compound capable of replacing the hydrogen in the 2-position of the acetic acid derivative by an alkali metal. The compound capable of replacing the hydrogen atom by an alkali metal preferably is an alkali metal amide or hydride. The halogen atom in Formula III preferably is a chlorine or bromine atom.

After the reaction has been completed, subsequent addition of water enables the alkali metal halide to be separated from the organic solution which may then be worked up in known manner.

In a less preferred process, when R is a 2- or 4-pyridyl group it is possible to replace the compound of general Formula III by a compound of the formula CH$_2$=CH—R. The pyridyl groups may then, if desired, be reduced to the corresponding piperidyl groups by hydrogenation, for example by catalytic reduction.

If it is desired to prepare a compound containing a hydroxy radical in one of the benzene rings, one can start with the corresponding methoxy compound and once the corresponding product of general Formula I has been produced, the methoxy radical can be converted to a hydroxy radical. This may be effected in known manner by treatment with aqueous hydrogen bromide. The hydroxy group can then, if desired, be acylated as if acyl groups are present initially they may be released during the reduction.

When X is other than a cyano or ester radical, it is advisable to prepare the corresponding nitrile or ester of general Formula I and only then to convert the nitrile or ester into the desired radical X. The nitrile final product of general Formula I can be converted to the corresponding primary amide (X is —CONH$_2$), for example by hydrolysis with alkaline hydrogen peroxide. The acid (X is —CO$_2$H) can be obtained by hydrolysis of the primary amide or ester. Alternatively, if desired the nitrile can be reduced with for example lithium aluminum hydride to the amine (X is a —CH$_2$NH$_2$ radical), or can be used to form the alkyl ketone (X is —CO alkyl) by treatment with for example a Grignard reagent or an alkyl lithium, (e.g. methyl lithium). The ketone can, if desired, be reduced to the secondary alcohol.

If the final product of general Formula I is an ester, it can, if desired, be saponified to the acid or reacted with an amine to give the amide; furthermore, the ester may be reduced, if desired, to the primary alcohol.

If the radical X comprises a hydroxy group, this may if desired be acylated or etherified.

The following reaction scheme illustrates the various processes which can be carried out from the nitriles. In this reaction scheme the radicals Y represents

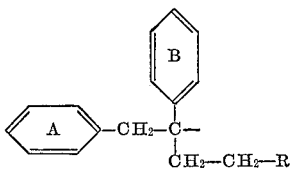

in which A, B, and R have the meanings defined above, and $R^3$ and $R^4$ are alkyl radicals.

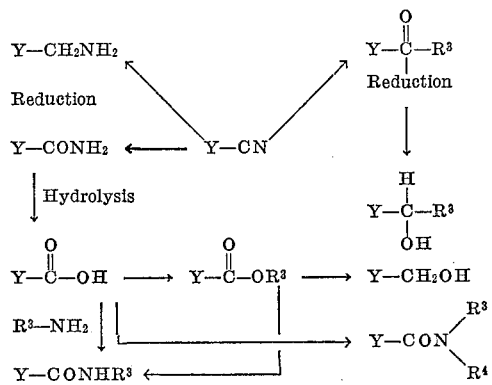

The most suitable method is followed in any particular case.

The initial unsubstituted starting materials in which X is a cyano radical can be prepared by condensing benzyl nitrile with benzadehyde and reducing the product formed. When a product substituted in rings A or B is required, the benzene rings can be substituted by radicals which are inert in the above reactions or, for example in the case of a hydroxy radical, this radical can be produced from the corresponding methoxy compound once the reactions have been completed. The other starting materials of this type can be prepared in similar manner or derived from the nitriles.

As stated above, the compounds of the invention generally have interesting pharmacological properties, and the present invention also provides a pharmaceutical composition comprising a compound of general Formula I, or a pharmaceutically acceptable acid addition or quaternary ammonium salt thereof (as the compounds contains a nitrogen atom) and a pharmaceutical carrier.

The pharmaceutically acceptable carrier used in the composition of the invention can be solid or liquid. Solid compositions include powders, tablets, dispersible granules, capsules, cachets and suppositories. A solid carrier can be one or more substances which may also act as flavouring agents, binders or tablet disintegrating agents; it can also be an encapsulating material. In powders the carrier is a finely-divided solid which is in admixture with the finely-divided compound. In tablets the active compound is mixed with a carrier having the necessary binding properties in suitable proportions and compacted in the size and shape desired. The powders and tablets preferably contain 5 or 10 to 99% of the active compound. Suitable solid carriers are, for example, pectin, dextrin, starch gelatin, tragacanth, methyl cellulose, sodium carboxymethyl cellulose, a low melting wax and cocoa butter.

Liquid form compositions include solutions, suspensions or emulsions. The active compound may be dissolved or suspended in a pharmaceutically acceptable liquid carrier, such as sterile water preferably containing a non-ionic surface active agent such as the esters, e.g. fatty acid esters of polyhydroxy compounds, e.g. sorbitan, and particularly their polyethylene oxide derivatives, for instance Tween 80. It may be dissolved in an organic solvent or a mixture thereof and it may contain flavoring agents or other substances. Conveniently the composition is in a sterile form suitable for parenteral injection.

The active compound can be dispersed, e.g. dissolved in a suitable organic solvent, for instance aqueous propylene glycol or polyethylene glycol. In other instances compositions can be made by dispersing the finely-divided active compound in aqueous starch in sodium carboxymethyl cellulose solution; or in a suitable oil, for instance arachis oil. Liquid pharmaceutical compositions which are sterile solutions or suspensions can be utilized by intramuscular, intraperitoneal, sub-cutaneous or intravenous injection.

In unit dose form the composition can be a packaged composition, the package containing discrete quantities of composition, for example, packeted powders or vials or ampoules.

The unit dosage form can be a capsule, cachet or tablet itself, or it can be the appropriate number of any of these in packaged form.

To prepare a composition in unit dosage form in accordance with the invention, the active compound can be mixed with a carrier and divided into unit dosage form. However, if desired the active compound can be used in the absence of a carrier.

The following examples illustrate the invention.

EXAMPLE 1

2-benzyl-2-phenyl-4-(4'-pyridyl)-butyronitrile hydrochloride 2,3-diphenyl acrylonitrile (15.91 g.) was dissolved in ethyl acetate (100 ml.) and hydrogenated in the presence of 10% Pd/C catalyst (2 g.) until 2.07 liters of hydrogen had been taken up. The mixture was filtered and the filtrate washed with water and dried over $MgSo_4$. The ethyl acetate solution was evaporated to yield crystalline solid (16.24 g. 100%) which was identified as 2,3-diphenyl propionitrile.

This substance (16.24 g.) in isopropyl alcohol (150 ml.) was added to a solution of sodium (1 g.) in isopropyl alcohol (50 mls.). Freshly distilled 4-vinylpyridine was added to the solution which was then boiled under reflux for 2½ hours. After cooling, water was added and the white crystals obtained were removed by filtration. Yield 20.73 g., M.P. 148–9° C.

10.9 g. of these crystals were dissolved in isopropyl alcohol and ethereal HCl added when the base hydrochloride separated. Yield 11.7 g. (95%) M.P. 179–80° C.

Analysis.—Found (percent): C, 76.0; H, 6.25; N, 8.1; Cl, 10.1. $C_{22}H_{21}N_2Cl$ requires (percent): C, 75.8; H, 6.1; N, 8.0; Cl, 10.2.

This compound showed analgesic activity when tested on laboratory animals.

EXAMPLE 2

2-benzyl-2-phenyl-4-(4'-pyridyl)butyronitrile methiodide 2-benzyl-2-phenyl-4-(4'-pyridyl)butyronitrile (12.0 g.) was dissolved in acetone (100 ml.) an methyliodide (15 ml.) was added. The solution was boiled under reflux using an acetone/drikold condenser for 2 hours and then left to cool when the yellow crystals that formed were separated, yield 13.81 g. (79.2%), M.P. 183–4° C. This compound showed analgesic activity.

Analysis.—Found (percent): C, 60.6; H, 5.3; N, 6.3; I, 27.8. $C_{23}H_{23}N_2I$ requires (percent): C, 60.8; H, 5.3; N, 6.2; I, 28.0%.

EXAMPLE 3

2-benzyl-2-phenyl-4-(1'-methyl-4'-piperidyl)butyronitrile hydroiodide 2-phenyl-2-benzyl-4-(4'-pyridyl) - butyronitrile methiodide (7.0 g.) was dissolved in absolute ethanol (250 ml.) and platinum oxide (1.0 g.) was added. The mixture was hydrogenated for 3 hours until the uptatke of hydrogen had ceased when 1390 ccs. of hydrogen were taken up (theory requires 1.31 liters.) The catalyst was removed and the filtrate evaporated to yield a foam, 6.98 g. which was crystallized from isopropyl alcohol/ether, yield 6.46 g. (91.0%), M.P. 192–4° C. This crop was recrystallized again to give 5.7 g., M.P. 193–4° C.

*Analysis.*—Found (percent); C, 60.1; H, 6.35; N. 6.00; I, 27.6. $C_{23}H_{29}N_2I$ requires (percent): C, 60.0; H, 6.1; N, 6.1; I, 27.8%.

EXAMPLE 4

2-benzyl-2-phenyl-4-(4'-pyridyl)-butyramide hydrochloride 2-benzyl-2-phenyl-4-(4'-pyridyl) - butyronitrile (12.0 g.) was dissolved in 70% sulphuric acid (100 mls.) and heated at 100 C. for 4 hours. The solution was left at room temperature for 12 hours and then neutralized with 40% sodium hydroxide solution and cooled. It was extracted with chloroform, and the chloroform extracts washed with water, brine and dried ($MgSO_4$). Evaporation under reduced pressure gave a white solid (13.79 g.), M.P. 168–71° C.

Some of the crude amide (7.0 g.) was dissolved in isopropyl alcohol and ethereal HCl added. The crystalline product which formed was filtered off. Yield 6.20 g., M.P. 219–20° C.

The hydrochloride was recrystallized from methanol/ether. Yield 5.56 g., M.P. 221–2° C.

*Analysis.*—Found (percent): C, 71.9; H, 6.5; N, 7.5; Cl, 9.6. $C_{22}H_{23}N_2OCl$ requires (percent): C, 72.0; H, 6.3; N, 7.6; Cl, 9.7%.

EXAMPLE 5

2-benzyl-2-phenyl-4-(4'-pyridyl)-butyramide methiodide 2-benzyl-2-phenyl-4-(4'-pyridyl)-butyramide (5.85 g.) was dissolved in hot isopropyl alcohol, and methyliodide (15 mls.) was added slowly to the warm solution, which was then left for 48 hours. The yellow crystals, which had formed, were filtered off and recrystallized from methanol-ether. Yield 5.64 g. Yield after recrystallization from methanol 5.15 g., M.P. 231–2° C.

*Analysis.*—Found (percent): C, 58.1; H, 5.2; N, 5.9; I, 27.0. $C_{23}H_{25}N_2OI$ requires (percent): C, 58.5; H, 5.3; N, 5.9; I, 26.9%.

This compound showel analgesic activity. The $LD_{50}$ was 353.5 mg./kg.

EXAMPLE 6

4-(3-benzyl-3-phenyl-4-oxo-n-hexyl)pyridine hydrochloride

A Grignard reagent was prepared from Mg(2.16 g. 2 moles) and ethyl bromide (9.9 g. 2 moles) in ether. A solution of 2-benzyl-2-phenyl-4-(4'-pyridyl)-butyronitrile (13.9 g. 1 mole) in dry toluene (ca. 35 ml.) was added dropwise and the ether removed by distillation until the internal temperature was 95–7° C. The residue was heated and stirred overnight on a water bath at 100° C. and, after cooling, 2 N-HCl (200 ml.) was added to decompose the complex. The mixture was heated on a steam bath for 90 minutes. The toluene layer was separated and washed with 2 N-HCl (100 ml.), then $NH_4Cl$ (60 g.) and excess of ammonia was added to the bulked acid extracts, the product was extracted into ether, which was washed with water, and dried ($MgSO_4$). Evaporation of the ether extract gave the crude product, which was crystallized from ethanol/ether. Yield 12.6 g., M.P. 103–5° C.

*Analysis.*—Found (percent): C, 83.8; H, 7.3; N, 4.2. $C_{24}H_{25}NO$ requires (percent) C, 83.9; H, 7.3; N, 4.1.

Some of this product (10.0 g.) was dissolved in isopropyl alcohol and ethereal hydrochloric acid was added. The crude precipitate was filtered off and the product recrystallized from isopropyl alcohol to yield 8.9 g. (80%) M.P. 185–8° C.

When tested on laboratory animals, this compound exhibited anti-metrazol activity, was active against maximal electroshock convulsions, and exhibited analgesic activity. The $LD_{50}$ in mice was more than 1000 mg./kg.

EXAMPLE 7

4-(3-carbonamido-3,4-diphenylbutyl)-1,1-dimethylpiperidinium iodide 2-benzyl-2-phenyl - 4 - (4'-pyridyl)-butyronitrile methiodide (40 g.) in ethanol (500 ml.) was mixed with 3 g. of platinum oxide and hydrogenation effected at room temperature until 7.2 liters of hydrogen had been taken up. The reaction mixture was filtered and the filtrate evaporated and then crystallized from isopropyl alcohol to give 35.23 g. (86.9%) of 2-benzyl-2-phenyl-4-(1'-methyl-4'-piperidyl)-butyronitrile hydroiodide of melting point 193–4° C.

The substance was treated with 10N sodium hydroxide (150 ml.) and extracted with chloroform to give 2-benzyl-2-phenyl-4-(1'-methyl - 4' - piperidyl)-butyronitrile of melting point 109–110° C. Yield 19.17 g. (75.2%).

This nitrile (9.1 g.) was dissolved in 70% sulphuric acid (100 ml.) and heated at 100° C. for 2 hours. After neutralization with 10N sodium hydroxide (260 ml.) the mixture was extracted with chloroform and the chloroform layer washed with brine, dried over $MgSO_4$ and evaporated to yield a yellow solid. After crystallization from methanol/water, 6.31 g. (66.5%) of 4-(3-carbonamido - 3,4 - diphenylbutyl)-1-methylpiperidine were obtained. Melting point 129–131° C.

The amide obtained (6.0 g.) was dissolved in acetone (200 ml.) by warming and methyliodide (10 ml.) added to the warm solution, which was then left overnight. The resulting crystals were filtered off. Yield 8.14 g., M.P. 135–6° C.

*Analysis.*—Found (percent): C, 58.5; H, 6.9; N, 5.54; I, 25.0. $C_{24}H_{33}N_2OI$ requires (percent) C, 58.5; H, 6.8; N, 5.7; I, 25.8.

This compound exhibited anti-metrazol activity when tested on laboratory animals.

What is claimed is:
1. 2-benzyl - 2 - phenyl - 4 - (1'-methyl-4'-piperidyl)-butyronitrile hydroiodide.
2. 2-benzyl - 2 - phenyl - 4 - (1'-methyl-4'-piperidyl)-butyronitrile.
3. 4-(3 - carbonamido - 3,4 - diphenylbutyl)-1-methylpiperidine.
4. 4 - (3 - carbonamido - 3,4 - diphenylbutyl)-1,1-dimethylpiperidinium iodide.

References Cited

Janssen et al.: Arch. Int. Pharmacodyn. 103 (1), 82–99 (1955), (pages 82–85, 88, and 91 supplied).

G. THOMAS TODD, Primary Examiner

U.S. Cl. X.R.

260—294, 294.3, 294.7, 294.9, 295, 296, 297; 424—263, 267